April 14, 1959 D. F. SPRENGELER ET AL 2,882,445

PROTECTIVE CIRCUIT

Filed Dec. 11, 1957 2 Sheets-Sheet 1

INVENTORS
DONALD F. SPRENGELER &
LAWRENCE A. MATONAK
BY H. D. O'Brien
Q. Baxter Warner
ATTORNEYS April 14, 1959 D. F. SPRENGELER ET AL 2,882,445

PROTECTIVE CIRCUIT

Filed Dec. 11, 1957 2 Sheets-Sheet 2

INVENTORS
DONALD F. SPRENGELER &
BY LAWRENCE A. MATONAK
G. W. O'Brien
Q. Baxter Warner
ATTORNEYS United States Patent Office 2,882,445

Patented Apr. 14, 1959

2,882,445

PROTECTIVE CIRCUIT

Donald F. Sprengeler, Englewood, Colo., and Lawrence A. Matonak, Maple Shade, N.J., assignors, by mesne assignments, to the United States of America as represented by the Secretary of the Navy

Application December 11, 1957, Serial No. 702,216

9 Claims. (Cl. 315—20)

Figure 1:
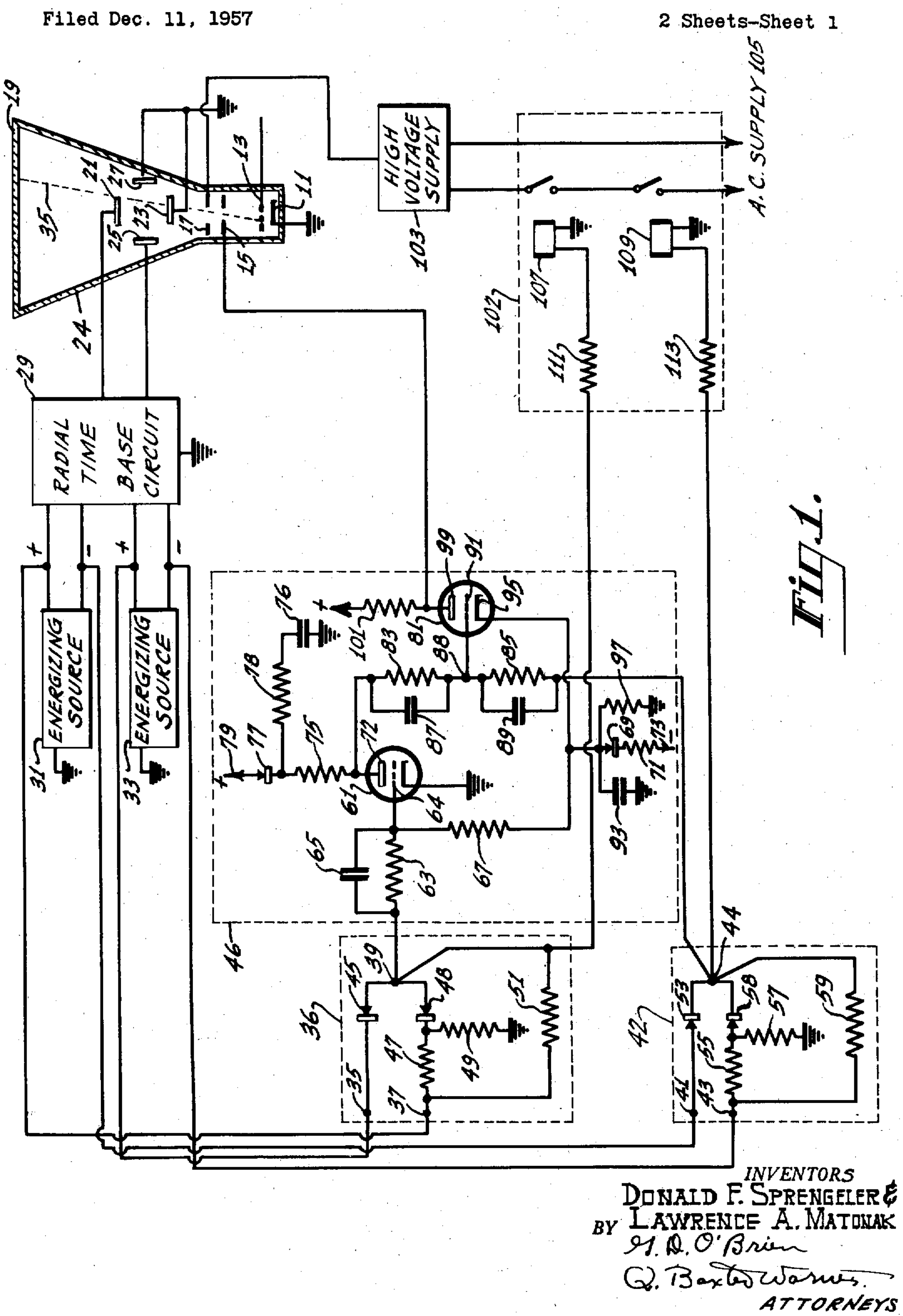

This invention relates to improved protective circuits for use in connection with electron discharge devices such as cathode ray tubes. In particular, the invention relates to improved circuits for preventing damage to the sensitive luminescent screen of a discharge device upon reduction in potential or reduction or increase in current of the energizing source for the electron beam deflection circuit.

Cathode ray tube protection circuits have been employed to prevent damage to the phosphor of television kinescopes or oscilloscopes when either the horizontal or vertical deflection signals fail. The failure of either continuous sweep signal causes the electron scanning beam to be deflected in only one direction, producing a single line on the luminescent screen. If the beam current is sufficiently large and if a sufficiently high accelerating voltage is applied to the anode of the cathode ray tube, this line will be burned into the screen phosphor and produce a blemish. A single spot, "beam burn" is produced if both deflection signals fail simultaneously. Known protection systems generally are responsive to the failure of the cyclic deflection energy applied to the tube deflection elements. Such protection has been accomplished using either all electronic or combined electronic and mechanical systems. However, such protection circuits will not function properly when the deflection signals are of an extremely small magnitude. A problem particularly arises in a circuit utilizing a non-continuous and non-repetitive sweep such as is used in a target and number writing display (in a plan position indication P.P.I. of moving radar targets). The sweep (including a radial time base circuit), may move the luminous trace barely one half inch and the sweep output will be too low to readily trigger such protection circuits. Further, the response time of an adequate protection circuit must be within microseconds to protect very sensitive phosphors such as long persistence phosphors used in cathode ray tubes. Therefore, mechanical means are precluded due to their inherent slowness.

One object of the present invention is to provide an improved protective circuit for cathode ray tubes by automatically reducing the intensity of the scanning beam when a D.C. energizing supply potential or supply current changes beyond a predetermined value.

The invention has particular application to cathode ray tubes using a non-continuous, and non-repetitive sweep and in that application a further object is to reduce the beam intensity as an incident to a reduction beyond a predesigned level of any energizing potential or an increase or decrease beyond a predetermined level of any supply current for the deflection circuits.

A still further object is to prevent "beam burns" of a highly sensitive phosphor screen by reducing the intensity of the scanning beam in microseconds and then disabling the high voltage anode supply.

The foregoing objects and attendant advantages may be accomplished in accordance with the invention by a circuit wherein the luminescent screen is protected when the electron scanning beam is not being deflected, such failure of deflection being due to a reduction in an energizing potential for, or to an increase or decrease in load current to, the deflection circuits. In the preferred embodiment of the protection circuit the energizing potentials are sampled and then applied to a control network. The control network is responsive to the sampled energizing potentials, and particularly to a decrease in a positive energizing potential and a decrease in a negative energizing potential (that is, becoming more positive). When a change beyond a predetermined level occurs, the control network provides protection in microseconds by causing the intensity of the beam to be reduced.

One embodiment also removes the high voltage anode supply to the cathode ray tube by means of relays operating coincident with the reduction in intensity of the beam. Such operation occurs even if the power supply to the protection circuit fails entirely. This operation is accomplished by means of storage networks whereby the supply voltage is maintained for a sufficient length of time to allow the protection circuit to reduce the intensity of the beam until the high voltage anode supply is disabled.

In another embodiment the protection action is triggered when the load current of the energizing source to the deflection circuits decreases or increases beyond predetermined levels.

Figure 2:
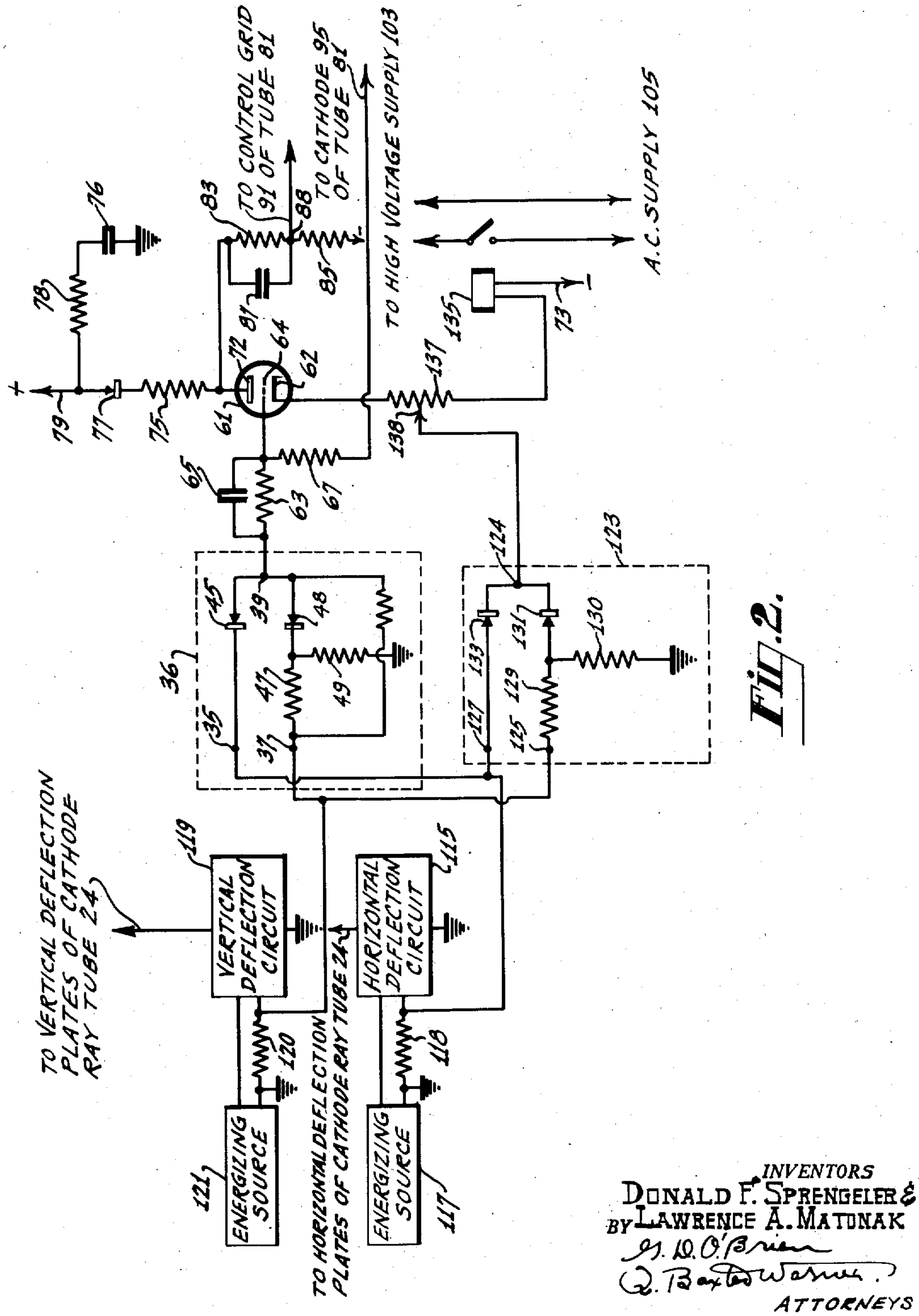

Other objects and many of the attendant advantages of this invention will be readily appreciated as the same becomes better understood by reference to the following detailed description when considered in connection with the accompanying drawings wherein:

Fig. 1 is a schematic circuit diagram of one embodiment of the invention in which positive and negative energizing potentials for a radial time base deflection circuit are sampled and, if any such potential changes sufficiently, the intensity of the scanning beam is decreased and then almost simultaneously the high voltage power supply is disabled; and Fig. 2 is a schematic circuit diagram of another embodiment in which the intensity of the scanning beam is decreased and then almost simultaneously the high voltage power supply is disabled when the load current increases or decreases beyond predetermined levels.

Similar reference characters are applied to similar elements throughout the drawings.

Referring to Fig. 1 of the drawings, a typical oscilloscope cathode ray tube 24 in a number writing, plan-position indicator (P.P.I.) radar dispaly includes, a cathode 11, a control grid 13, a first anode 15, a second anode 17 and a phosphor screen 19. Horizontal deflection elements, for example deflection plates 21 and 23 and similar vertical deflection elements, for example, deflection plates 25 and 27 are actuated by a radial time base circuit 29 which is energized from energizing sources 31 and 33. Examples of these types of deflection circuits are shown in M.I.T. Radiation Laboratory Series, volume 22, pages 445–481. The resultant fields on the deflection elements deflect the cathode ray beam 35 across the phosphor face of the screen 19.

The positive energizing potentials of the energizing sources 31 and 33 are applied to a first input 35 and a second input 37 of a first sampling means 36. The least positive energizing potential is applied to the first input 35 and the most positive energizing potential is applied to the second input 37. When either of these inputs decreases, the potential at an output junction 39 of this first sampling means 36 also decreases. The negative energizing potentials of the energizing sources 31 and 33 are applied to a first input 41 and a second input 43 of a second sampling means 42. The least negative energizing potential is applied to the first input 41 and the most negative energizing potential is applied to the second input 43. When either of these inputs becomes less negative (that is, increases in a positive direction), the potential at an output junction 44 of this second sampling means 42 also becomes less negative.

The output junction 39 of first sampling means 36 and the output junction 44 of second sampling means 42 are coupled to a control means 46. The control means 46 is connected to the first anode 15 of the cathode ray tube 24 whereby the potential on the first anode 15 is decreased when either output junction 39 or 44 decreases in potential. This decrease in potential of the first anode 15 is sufficient to cut off the electron beam 35.

As was described before, of the two positive energizing potentials of the energizing sources 31 and 33, the least positive is applied to the first input 35 of the first sampling means 36; the most positive potential is applied to the second input 37 of this same sampling means. Between the first input 35 and the output junction 39 of this sampling means, a current path is defined, which includes diode 45. Between the second input 37 and the output junction 39, two current paths are defined. The first includes a voltage divider network consisting of two resistors 47 and 49 and another diode 48 connected in series with the voltage divider network. The second includes a resistor 51 which is connected in parallel with the series combination of the voltage divider (resistors 47 and 49) and diode 48.

A specific example of the operation of the first sampling means 36 is illustrated when 250 volts is applied to the first input 35 and 300 volts is applied to the second input 37. The output of the voltage divider consisting of resistors 47 and 49 decreases the 300 volts to approximately 250 volts. Initially, the potential at the output junction 39 is the difference between 300 volts and the voltage drop across resistor 51. Therefore, the potential at output junction 39 is at some value greater than the potential at the cathode sides of diodes 45 and 48 so that current will flow through the diodes. Initially, current flow through both diodes increases and the potential drop across resistor 51 increases causing the potential at the output junction 39 to decrease. This current flow through both diodes continues until the potential at the output junction 39 is at approximately the potential of the cathode side of one or the other of the diodes 45 and 48, at which time that particular diode will cut off. The other diode will continue to conduct until the potential at the output junction 39 is at approximately the same level as the potential at the cathode side of that diode and then that diode also will cut off. Therefore, the potential at the output junction 39 is maintained at the lower potential of the potentials applied at the cathode sides of diodes 45 and 48.

As was mentioned before, of the two negative energizing potentials of the energizing sources 31 and 33, the least negative is applied to the first input 41 of the second sampling means 42; the most negative potential is applied to the second input 43 of this same sampling means. Between the first input terminal 41 and the output junction 44 of this sampling means, a current path is defined, which includes the diode 53. Between the second input terminal 43 and the output junction 44, two current paths are defined. The first includes a voltage divider network consisting of resistors 55 and 57 and another diode 58 connected in series with the voltage divider network. The second current path includes a resistor 59 which is connected in parallel with the series combination of the voltage divider (resistors 55 and 57) and diode 58. The operation of second sampling means 42 using negative energizing potentials is similar to the operation of first sampling means 36 using positive energizing potentials. The current flow in the two current paths in the second sampling means 42 is the reverse of the current flow in the two current paths in the first sampling means 36. Therefore, the potential at output junction 44 is maintained at the potential of the least negative (that is, most positive), of the potentials applied at the plate sides of diodes 53 and 58.

Within the control means 46 is a normally conducting tube 61. The output of the output junction 39 of the first sampling means 36 is applied through a grid resistor 63 in parallel with a speed-up capacitor 65 to a control grid 64 of the normally conducting tube 61. The speed-up capacitor 65 allows the voltage across the grid resistor 63 to drop quickly. The high frequency components of the step function generated by a sudden reduction in an energizing source potential are transferred rapidly to the control grid 64. Control grid 64 is also connected through a bias resistor 67, a diode 69 and a resistor 71 to a negative voltage supply 73. The bias on the control grid 64 is adjusted by selecting the values of the grid resistor 63 and the bias resistor 67 so that the output of output junction 39 maintains the tube 61 normally conductive. When the output junction 39 of the first sampling means 36 drops below a predetermined level, the bias on the control grid 64 is decreased thereby cutting off the normally-conducting tube 61.

The anode 72 of the normally-conducting tube 61 is connected through a plate load resistor 75, through a supply diode 77 to its anode supply 79. A current limiting resistor 78 is connected in series between the cathode of the diode 77 and a storage capacitor 76 to limit any surge of charging current to a safe value for the diode 77. During normal operation the storage capacitor 76 is charged to the potential of the anode supply 79. The anode supply 79 may fail simultaneously with a reduction in voltage of a positive energizing potential. When the anode supply 79 fails, the storage capacitor 76 starts to discharge thereby providing operating potential for tube 61. The embodiment illustrated in Fig. 1 may, therefore, maintain its anode supply 79 by means of the storage network for a period of time depending upon the discharge rate of the storage capacitor 76.

Within the control means 46 is a normally non-conducting tube 81. This tube 81 is maintained cut off during normal conditions by the combined effect of a normal negative potential at the output junction 44 of the second sampling means 42 and normal conduction of the normally-conducting tube 61. (This operation will be described in greater detail hereinafter.) The output of the output junction 44 is connected through summing resistors 83 and 85 to the anode 72 of the tube 61. Two speed-up capacitors 87 and 89 are connected in parallel with the summing resistors 83 and 85. The operation of these speed-up capacitors is similar to that of the previously mentioned speed-up capacitor 65. A connection 88 between the summing resistors is coupled to the control grid 91 of the normally non-conducting tube 81. The values of the summing resistors 83 and 85 are so chosen that there will be a negative bias on the control grid 91 which will maintain the tube 81 nonconductive during normal operation of the output junction 44 and of the normally-conducting tube 61. A storage capacitor 93 is connected between the cathode 95 and ground and a diode 69 is connected in series between a resistor 71 and the cathode 95 of the normally non-conducting tube 81. The storage action of the storage capacitor 93 and the current limiting resistor 97 is similar to that described for the storage circuit in the anode supply of the normally-conducting tube 61. This storage action maintains a negative potential on the cathode 95 to allow the tube 81 to conduct if the negative cathode supply should fail.

A reduction in potential beyond a predetermined value at the output junction 39 of the first sampling means 36 will cause the normally-conducting tube 61 to be substantially cut off and current will stop flowing through the plate load resistor 75. When this happens, the anode 72 will increase in potential and be at substantially the same level as its anode supply. Because of this, the potential at the connection 88 between the summing resistors 83 and 85 will increase and the bias on the control grid 91 will then increase sufficiently to bring the normally non-conducting tube 81 to conduction. Similarly, when the output junction 44 of the second sampling means 42 becomes less negative (that is, changes in a positive direction to beyond the predetermined level), the potential at the connection 88 increases in potential and the bias on control grid 91 will then increase sufficiently to bring the normally non-conducting tube 81 to conduction. Thus, if either the output junction 39 or the output junction 44 changes beyond a predetermined level the normally non-conducting tube 81 becomes conductive.

The first anode 15 of the cathode ray tube 24 is connected to the anode 99 of the normally non-conducting tube 81 and is maintained at its operating potential during normal performance. When the normally non-conducting tube 81 conducts, current flows through its plate resistor 101 causing a voltage drop thereacross, the potential on the anode 99 decreases with respect to ground and the bias on the first anode 15 of the cathode ray tube 24 thereby decreases. This decrease in the first anode 15 bias impedes the flow of the electron beam 35 in the cathode ray tube 24 and substantially cuts off that beam 35 rendering it harmless. The circuit may be so designed that a small change in an energizing potential will not be sufficient to bring the normally non-conducting tube 81 to maximum conduction. However, the first anode 15 may decrease in potential sufficiently to reduce the intensity of the scanning beam 35 to prevent "beam burns." Although the first anode 15 is used in the embodiment illustrated in Fig. 1, any intensity control electrode may be utilized for the same purpose.

An added feature of the Fig. 1 embodiment of this invention is a relay means 102 controlled by the two sampling means 36 and 42 to disconnect the A.C. supply 105 from the high voltage anode supply 103 when any energizing potential changes beyond a predesigned level. The relay means 102 is comprised of two relays 107 and 109 which are energized during normal operation so as to connect the A.C. supply 105 to the high voltage anode supply 103. When the relays 107 and 109 are de-energized, the A.C. supply 105 is disconnected from the high voltage anode supply 103. The output junction 39 of the first sampling means is connected through a current limiting resistor 111 and through the first relay 107 to ground. The limiting resistor 111 is chosen to give the proper coil current to operate the relay 107. When the output junction 39 decreases to a predesigned level, the first relay 107 is de-energized thereby disconnecting the A.C. supply 105 from the high voltage anode power supply 103. In the same manner, the output junction 44 of the second sampling means 42 is connected through a limiting resistor 113 and through the second relay 109 to ground. When any input negative potential becomes less negative (that is, changes in a positive direction), beyond a predetermined value, the second relay 109 is de-energized thereby also functioning to disconnect the A.C. supply 105 from the high voltage supply 103.

The above relay action in cutting off the electron beam by disabling the high voltage is comparatively slow. The relays 107 and 109 require time to operate and the high voltage needs time to decay. The control means 46, to the contrary, operates within microseconds but may render protection for only as long as its storage networks supply sufficient operating energy if its own supply voltages fail. The combination of the two actions fulfills the requirements of speed and ultimate protection in any circumstances. The scanning beam 35 is disabled until all the energizing potentials for the deflection circuits are returned to their normal potentials. When the deflection circuits are again normally energized, the high voltage anode supply is switched on by means of the relays 107 and 109 and the first anode 15 is returned to its normal potential by means of the control means 46.

It will be understood, that, although the present invention is being illustrated and described in connection with two positive energizing potential inputs and two negative energizing potential inputs the invention may, with additional input diodes and additional voltage dividers, utilize any number of energizing potential inputs. These additional inputs are not limited to the energizing potentials of the deflection circuits but may include any energizing potential that is normally maintained at a definite potential.

Referring to Fig. 2, a modification of the first illustrated embodiment is shown which is adapted for use with television kinescopes, oscilloscopes, and the like. Horizontal deflection elements, for example, deflection plates 21 and 23, are actuated by a horizontal deflection circuit 115 which is energized from an energizing source 117. Similar vertical deflection elements, for example, deflection plates 25 and 27 are actuated by a vertical deflection circuit 119 which is energized from an energizing source 121. This modification of the Fig. 1 embodiment is responsive to a change of energizing current of either of the energizing sources 117 and 121.

Temperature stable precision shunts 118 and 120 are placed in series between the energizing sources 117 and 121 and the deflection circuits 115 and 119 so that changes in potential across each of the shunts 118 and 120 may be sensed by the protection circuit. The deflection circuits 115 and 119 must be normally constant current loads so that the current through the shunts 118 and 120 is constant and the potential drop across each of the shunts 118 and 120 is therefore normally constant. The resistance values of the shunts 118 and 120 are selected such that the potential drops across them will provide sufficient operating potentials for the protection circuit.

The potentials sensed across each of the shunts 118 and 120 are applied to the first sampling means 36 and a modified sampling means 123. When a sensed potential decreases, the output junction 39 of the first sampling means 36 also decreases in potential. When a sensed potential increases, the output junction 124 of the modified sampling means 123 also increases in potential. The output junction 39 and the output junction 124 are coupled to a normally conducting tube 61. As long as the potentials at the two output junctions 39 and 124 are maintained at a normal operating value, this tube 61 will conduct. The normally conducting tube 61 is again connected through a normally non-conducting tube 81 to the first anode 15 of the cathode ray tube 24 in a manner identical with that described in connection with the embodiment illustrated in Fig. 1. Thus, should the normally conducting tube 61 be cut off, a potential drop will result at the first anode 15 cutting off the electron beam 35.

As hereinbefore described, the potentials sensed across each of the shunts 118 and 120 are applied to the first sampling means 36. The more positive potential of the potentials sensed is applied to the second input 37 and the less positive potential is applied to the first input 35. The first input 35 of the first sampling means 36 is connected through the diode 45 to the output junction 39 and the second input 37 is connected through the voltage divider network consisting of resistors 47 and 49, through diode 48, to the output junction 39. The operation of the first sampling means 36 is identical to the first sampling means as described in connection with Fig. 1. Therefore, the potential at output junction 39 is maintained at the lower potential of the two potentials applied to the cathode sides of the diodes 45 and 48.

As aforementioned, the sensed potentials are also applied to the modified sampling means 123 which is responsive to an increase in potential. The more positive of the sensed potentials is applied to a first input 125 and the less positive sensed potential is applied to another input 127. The first input 125 is connected through a voltage divider network consisting of two resistors 129 and 130, through the diode 131, to the output junction 124. The voltage divider (resistors 129, 130) is identical to the voltage divider consisting of the resistors 47 and 49 of the first sampling means 36 and functions in an identical manner. The other input 127 is connected through the diode 133 to the output junction 124. The potential at the output junction 124, coupled to the cathodes of the diodes 131 and 133, is maintained at the highest potential applied at the plates of these diodes. Both the diodes 131 and 133 conduct until the output junction 124 is at approximately the same potential as the plate of either one or the other of the diodes, at which time that diode will cut off. The other diode will continue to conduct until a steady state condition is reached whereby the potential at the cathode of that diode is substantially the same as the potential at the plate of that diode. Therefore, the potential at the output junction 124 is maintained at the highest potential applied to the plates of the diodes 131 and 133. Additional inputs may be used by adding additional shunts, diodes, and voltage dividers.

The output of the output junction 39 of the first sampling means 36 maintains the normally conducting tube 61 normally conductive. The control grid 64 biasing arrangement of the tube 61 is identical to that described in connection with Fig. 1. Therefore, when the output junction 39 of the first sampling means 36 drops below a predetermined level, the bias on the control grid 64 of the normally conducting tube 61 is decreased thereby cutting off the tube 61. This tube 61 is also maintained conductive by means of the modified sampling means 123. The cathode 62 of the tube 61 is connected through a cathode resistor 137 to the output junction 124 of the modified sampling means 123 through a tap 138 on the cathode resistor 137. The cathode resistor 137 is also connected through normally closed relay 135 to a source of negative potential 73. The negative potential 73 and the tap 138 on the cathode resistor 137 are selected so that the tube 61 is normally conductive. When the output junction 124 increases in potential beyond a predesigned level, it causes the cathode 62 to become more positive thus cutting off normally conducting tube 61.

The normally conducting tube 61 is connected through the normally non-conducting tube 81 to the first anode 15 (Fig. 1) in an identical manner as was described in connection with Fig. 1. Therefore, when the supply currents through either of the shunts 118 and 120 increases or decreases beyond a predetermined level, the normally conducting tube 61 is cut off and the electron beam 35 is also cut off.

An added feature of this embodiment is the normally closed relay 135 controlled by the two sampling means 36 and 123 to disconnect the A.C. supply 105 from the high voltage anode supply 103 when any energizing current changes beyond a predetermined level. The normally closed relay 135 is energized when normally conducting tube 61 is conducting. When so energized, the relay connects the A.C. supply 105 to the high voltage supply 103. When tube 61 is cut off, the cathode current decreases and relay 135 is de-energized thereby disconnecting the A.C. supply 105 from the high voltage supply 103.

This invention is equally applicable in its broader aspects for use in other electrical circuits in which electron discharge devices are incorporated, such, for example, as to protect the power output tubes in the final stage of a transmitter in the event that the driving power for these tubes should fail.

The protection circuit herein described thus affords protection when the electron scanning beam is not being deflected wherein such failure of deflection is due to a reduction in a D.C. energizing potential for, or to an increase or decrease in load current to the deflection circuits.

Obviously many modifications and variations of the present invention are possible in the light of the above teachings. It is therefore to be understood that within the scope of the appended claims the invention may be practiced otherwise than is specifically described.

What is claimed is:

1. A protection circuit for a cathode ray tube, said cathode ray tube including a fluorescent screen, a cathode, at least one electron beam intensity control electrode, an accelerating electrode, means for deflecting said electron beam in response to deflection circuits, and connections for a plurality of positive and negative energizing potentials for energizing said deflection circuits; said protection circuit comprising: first sampling means to sample all the positive energizing potentials and whose output is responsive to said potentials, said output decreasing in potential when at least one of said positive energizing potentials decreases, normally conducting tube means maintained in a conduction state by a normal potential at said output of said first sampling means, said normally conducting tube means being rendered non-conductive when one of said positive sources decreases beyond a predetermined level, additional sampling means similar to said first sampling means to sample said negative energizing potentials and whose output is responsive to said potentials, said output becoming less negative when at least one of said negative energizing potentials becomes less negative, summing resistor means whereby said additional sampling means and the output of said normally conducting tube means are connected, normally non-conducting tube means so coupled to said summing resistor means that said tube is rendered conductive when either said normally conducting tube cuts off or said output of said additional sampling means becomes less negative beyond a predetermined level, said normally non-conducting tube means to normally maintain said beam intensity control electrode of said cathode ray tube at a normal positive potential, the potential to said beam intensity control electrode to be reduced thereby reducing the intensity of the scanning beam when said normally non-conducting tube means becomes conductive.

2. A protection circuit for a cathode ray tube, said cathode ray tube including a fluorescent screen, a cathode, at least one electron beam intensity control electrode, an accelerating electrode and means for deflecting said electron beam, said cathode ray tube having associated therewith deflection circuits controlling said deflecting means including connections for applying a plurality of energizing current sources to said deflection circuit; said protection circuit comprising: means to sense said energizing currents, means to connect a first sampling means to said sensing means, the output of said first sampling means responsive to a decrease in at least one of said energizing currents, said output to decrease in potential when one of said energizing currents decreases; means to connect a second sampling means to said sensing means, the ouput of said second sampling means responsive to an increase in at least one of said energizing currents, said output to increase in potential when one of said energizing currents increases; normally non-conducting tube means maintained in a non-conducting state by normal potentials at said outputs of said first and said second sampling means, said normally non-conducting tube means being rendered conductive when one of said outputs changes beyond a predetermined amount, means to connect said beam intensity control electrode to said normally non-conducting tube means to provide normal operating positive potential to said electrode.

3. A protection circuit for a cathode ray tube, said cathode ray tube including a fluorescent screen, a cathode, at least one electron beam intensity control electrode, an accelerating electrode and means for deflecting said electron beam, said cathode ray tube having associated therewith deflection circuits controlling said deflecting means including connections for a plurality of energizing current sources to said deflection circuits; said protection circuit comprising: means to sense said energizing currents, means to connect a first sampling means to said sensing means, said first sampling means responsive to a decrease in at least one of said energizing currents, the output of said first sampling means to decrease in potential when one of said energizing currents decreases; means to connect a second sampling means to said sensing means, said second sampling means responsive to an increase in at least one of said energizing currents, the output of said second sampling means to increase in potential when one of said energizing currents increases; normally conducting tube means maintained in a conduction state by a normal potential at said outputs of said first and said second sampling means, said normally conducting tube means being rendered non-conductive when one of said outputs changes beyond a predetermined amount; normally non-conducting tube means coupled between said normally conducting tube means and said beam intensity control electrode, said normally non-conducting tube means maintained non-conducting during normal operations by the effect of the normal conduction of said normally conducting tube means, said normally non-conducting tube means maintaining said beam intensity control electrode at a normal positive potential when said normally non-conducting tube means is cut off.

4. A protective circuit for a cathode ray tube having electron beam intensity control means supplied with electrical potential, beam deflection means, and beam accelerating means, at least one deflection circuit coupled to said deflection means, a high voltage connection to said accelerating means, and means supplying plural potentials for energizing said deflection circuit; said protection circuit comprising: detection means connected across said means supplying potentials for immediately recognizing preselected ranges indicative of predetermined proper operating potentials supplied said deflection circuit, means actuated by said detection means when said predetermined ranges are not detected, said last-mentioned means comprising an electron tube amplifier circuit of short time constant for producing an amplified output without substantial delay upon actuation of said amplifier circuit by said detection means, and means coupled to said output of said amplifier circuit to reduce the potential supplied said beam intensity control means in response to said amplifier output, whereby the beam intensity of said cathode ray tube is reduced virtually instantaneously when improper potentials are supplied said deflection circuit.

5. The apparatus as recited in claim 4 additionally including means for interrupting said high voltage connection in response to said output of said amplifier.

6. The apparatus as recited in claim 4 including plural means for storing operating currents for elements of the tube of said amplifier, each of said means comprising a diode poled to normally pass operating current to said elements, each said diode connecting one of said elements to its operating voltage, and a storage capacitor grounded on one plate thereof and the remaining plate being coupled to the element side of said diode.

7. A protective circuit for a cathode ray tube having electron beam intensity control means supplied with electrical potential, beam deflection means, and beam accelerating means, at least one deflection circuit coupled to said deflection means, a high voltage connection to said accelerating means, and means supplying plural currents for energizing said deflection circuit; said protection circuit comprising: impedances connected serially with said means supplying currents, detection means connected to the deflection circuit ends of said impedances for immediately recognizing predetermined ranges of currents indicative of proper operating currents supplied said deflection circuit, means actuated by said detection means when said predetermined ranges are undetected, said last-mentioned means comprising an electron tube amplifier circuit of short time constant for producing an amplified output without substantial delay upon actuation by said detection means, and means coupled to said output of said amplifier circuit for reducing the electrical potential supplied said beam intensity control means in response to said amplifier output, whereby the beam intensity of said cathode ray tube is reduced virtually instantaneously when improper currents are supplied to said deflection circuit.

8. The apparatus as recited in claim 7 additionally including means for interrupting said high voltage connection in response to said output of said amplifier.

9. The apparatus as recited in claim 7 including plural means for storing operating currents for elements of the tube of said amplifier, each of said means comprising a diode poled to normally pass operating current to said elements, each said diode connecting one of said elements to its operating voltage, and a storage capacitor grounded on one plate thereof and the remaining plate being coupled to the element side of said diode.

References Cited in the file of this patent

UNITED STATES PATENTS

| | | |
|---|---|---|
| 2,577,848 | Greenleaf et al. | Dec. 11, 1951 |
| 2,584,932 | Snyder et al. | Feb. 5, 1952 |
| 2,607,018 | Stolze | Aug. 12, 1952 |
| 2,709,768 | King | May 31, 1955 |
| 2,810,858 | Stern et al. | Oct. 22, 1957 |